E. L. BLY.
WINDLASS ATTACHMENT FOR MOTOR DRIVEN VEHICLES.
APPLICATION FILED JUNE 13, 1918.
1,296,615.
Patented Mar. 11, 1919.
2 SHEETS—SHEET 1.
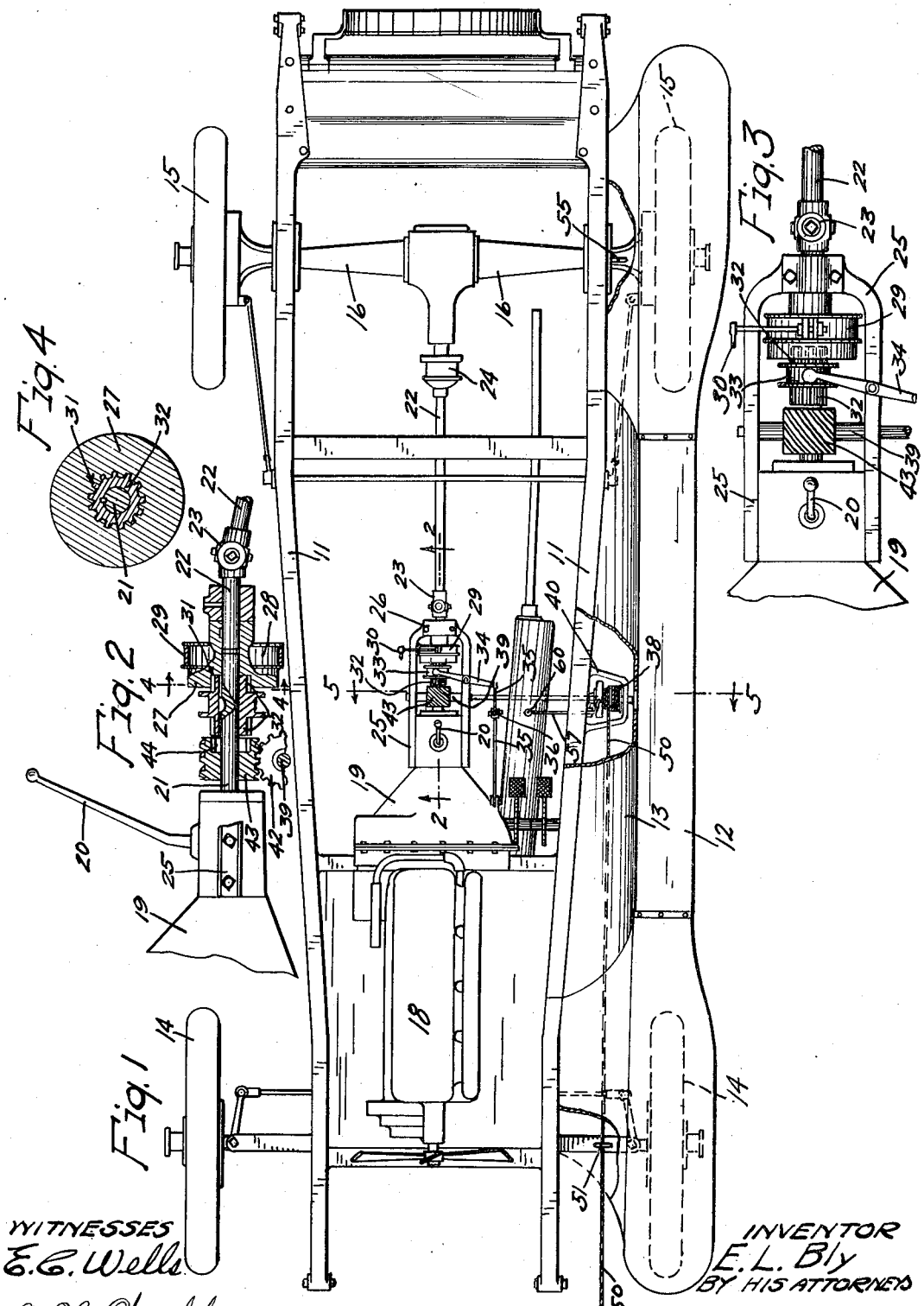
WITNESSES
E. C. Wells
A. H. Opsahl
INVENTOR
E. L. Bly
BY HIS ATTORNEYS
Williamson Merchant

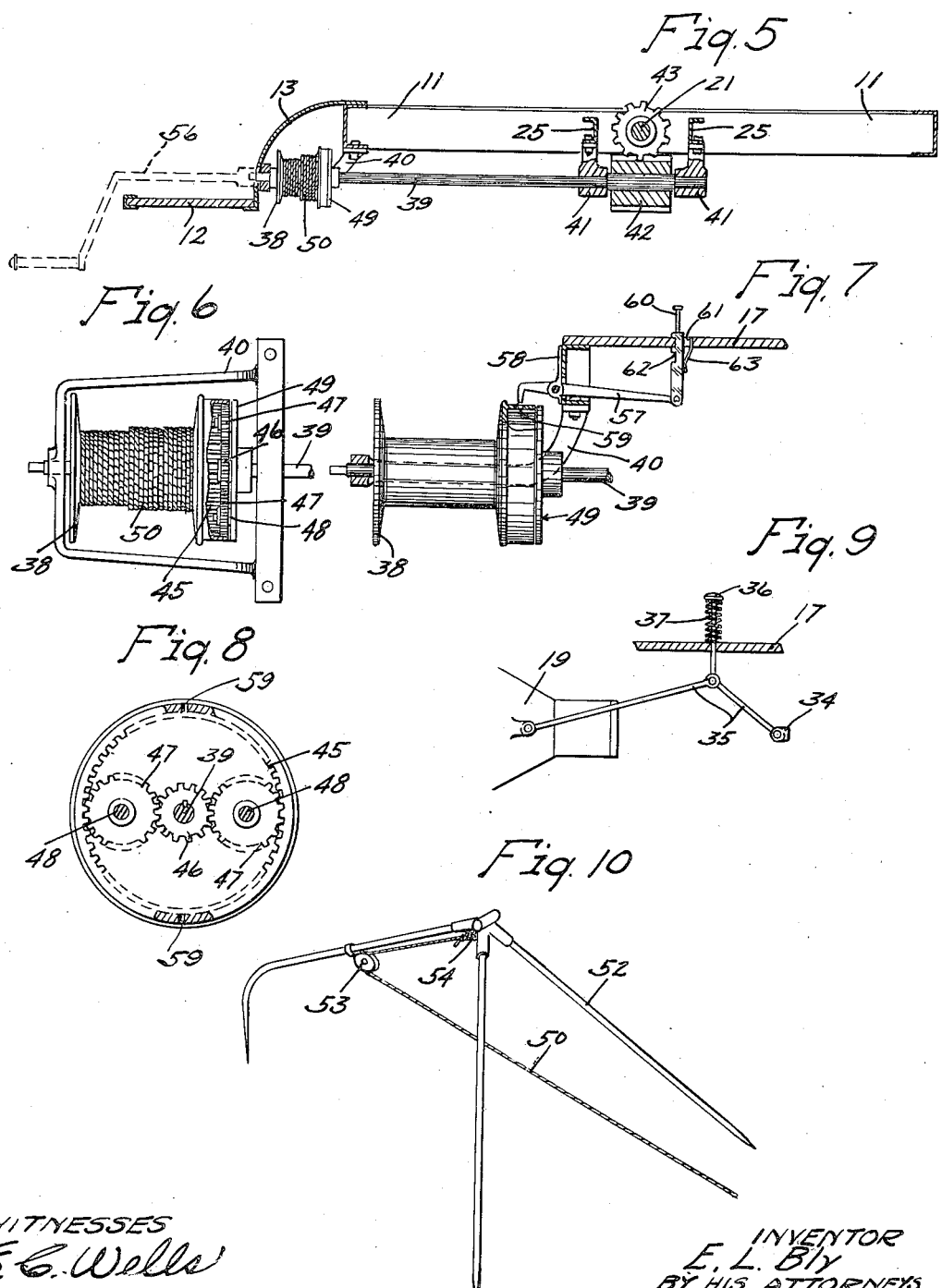

UNITED STATES PATENT OFFICE.

ELMER L. BLY, OF STANLEY, WISCONSIN.

WINDLASS ATTACHMENT FOR MOTOR-DRIVEN VEHICLES.

1,296,615.

Specification of Letters Patent.   Patented Mar. 11, 1919.

Application filed June 13, 1918.   Serial No. 239,716.

*To all whom it may concern:*

Be it known that I, ELMER L. BLY, a citizen of the United States, residing at Stanley, in the county of Chippewa and State of Wisconsin, have invented certain new and useful Improvements in Windlass Attachments for Motor-Driven Vehicles; and I do hereby declare the following to be a full, clear, and exact description of the invention, such as will enable others skilled in the art to which it appertains to make and use the same.

My invention relates to windlass attachments for motor-driven vehicles; and, to this end, it consists of the novel devices and combinations of devices hereinafter described and defined in the claims.

In the accompanying drawings, which illustrate the invention, like characters indicate like parts throughout the several views.

Referring to the drawings,

Figure 1 is a plan view of an automobile with certain parts removed and having the invention incorporated therein;

Fig. 2 is a view partly in left side elevation and partly in longitudinal vertical section taken on the line 2—2 of Fig. 1, on an enlarged scale;

Fig. 3 is a plan view of the parts shown in Fig. 2;

Fig. 4 is a detail view in section taken on the line 4—4 of Fig. 2, on an enlarged scale;

Fig. 5 is a view partly in elevation and partly in transverse vertical section taken on the line 5—5 of Fig. 1, on an enlarged scale, and also illustrating, by means of broken lines, a hand crank applied to the windlass shaft;

Fig. 6 is a plan view of the windlass and windlass frame, on an enlarged scale, with some parts broken away;

Fig. 7 is a view partly in rear elevation and partly in transverse vertical section of the windlass and foot-actuated latch for locking the same against rotation;

Fig. 8 is a view of the inner end of the windlass;

Fig. 9 is a view of the clutch-actuating means; and

Fig. 10 is a perspective view of the cable-anchoring tripod.

It is only necessary to note briefly the following parts of the automobile illustrated, to wit:—frame 11, left-hand running board 12 and its guard 13, front wheels 14, rear traction wheels 15, rear axle structure 16, and body floor 17.

The numeral 18 indicates as an entirety an internal combustion engine and bolted to the rear end of its casing is a transmission case 19. from which projects a gear shift lever 20. Extending from the transmission case 19 to the rear axle structure 16, is a transmission shaft, which comprises a driving member 21 and a driven member 22, the latter of which is provided with front and rear universal joints 23 and 24, respectively. The prongs of a horizontally disposed yoke-like bracket 25 embrace the transmission case 19 and are rigidly secured thereto. In the transverse portion of the bracket 25, is a bearing 26, in which the forward section of the driven member 22 of the transmission shaft is journaled.

The abutting ends of the shaft members 21 and 22 are inserted into an axial opening in a hub-like coupling 27, the latter of said members being keyed to said coupling, while the former is free to rotate therein. Formed with the coupling 27, is an annular brake surface 28 having applied therearound a brake band 29. Only part of the connections 30 for operating the brake band 29 are illustrated, and, for the purpose of this case, it will not be necessary to further consider the same.

The coupling 27 is located within the bracket 25 and formed in its front end, is an internal tooth-equipped half-clutch member 31. To secure the driven shaft 22 to the driving shaft 21, for common rotation therewith, I mount on said driving shaft a sleeve-like clutch 32 having external teeth arranged to interlock with the half-clutch member 31 by an axial sliding movement of said clutch 32. The clutch 32 is keyed to the driving shaft 21, with freedom for axial sliding movement thereon, and has integrally formed with its intermediate portion a shipper collar 33.

The clutch 32 is moved into and out of the half-clutch member 31 by a shipper lever 34 intermediately fulcrumed on the left hand prong of the bracket 25, with its inner end extending between the flanges of the shipper collar 33. This shipper lever 34 is operated by a pair of toggle links 35, one of which is pivoted to the outer end thereof and the other of which is pivotally connected to the transmission case 19. The toggle links 35 are, in turn, operated by a foot pedal 36 to move the clutch 32 out of the half-clutch member 31. The stem of the foot pedal 36 is extended through the floor 17 and pivoted to the intermediate joint of the toggle links 35. A coiled spring 37, compressed between the foot pedal 36 and floor 17, normally holds the toggle links 35 upward in buckled relation, which, in turn, hold the shipper lever 34 in position to normally keep the clutch 32 interlocked with the half-clutch member 31.

A windlass drum 38, located under the running board guard 13, is loosely journaled on the outer end of a transverse shaft 39. The outer end portion of the shaft 39 is journaled in a bracket 40 secured to the adjacent side member of the frame 11 and the inner end portion thereof is journaled in a pair of depending brackets 41 secured to the prongs of the brackets 25.

To drive the windlass shaft 39 from the driving member 21 of the transmission shaft, I key to the inner end thereof, between the bearing brackets 41, a worm gear 42 that meshes with a worm 43 loosely journaled on said driving member, between the transmission case 19 and clutch 32. Formed in the rear end of the worm 43, is an internal tooth-equipped half-clutch member 44 arranged to receive the clutch 32 when moved forward, and thereby secure the worm 43 to the driving member 21 for rotation therewith. The length of the clutch 32 is such that the same may be moved into interlocking engagement with either of the half-clutch members 31 or 44, or when set in intermediate position, will be simultaneously interlocked with both of said half-clutch members.

As previously stated, the windlass drum 38 is loosely journaled on the windlass shaft 39 and is connected for rotation therewith by speed-reducing gears comprising an internal gear 45 on the inner end of said drum, a pinion 46 keyed to the windlass shaft 39 and two intermediate gears 47, which mesh with the gear 45 and pinion 46. The intermediate gears 47 are loosely journaled on diametrically opposite studs 48 secured to a relatively fixed hub-equipped disk 49. As best shown in Figs. 6, 7 and 8, the inner flange of the windlass drum 38, internal gear 45 and disk 49 form a housing for the speed-reducing gears.

One end of a pulling cable 50 is attached to and arranged to be wound upon the windlass drum 38 and its intermediate portion is extended through an eye 51 secured to the front axle of the automobile. The other or outer end of the cable 50 is secured to an anchor, as shown, in the form of a tripod 52. One leg of the tripod 52 is bent inward to form a large ground-engaging hook and the other legs of the tripod form the support or base of resistance for the upper end thereof. The outer end portion of the cable 50 is extended over a guide sheave 53 secured to the intermediate portion of the bent tripod leg and attached to an eye 54 secured to the top of the tripod.

The pulling cable 50, as shown, is arranged to pull the automobile forward and is wound onto the windlass drum 38 over the top thereof, but if it is desirable to pull said automobile backward, the cable must be arranged to wind onto the windlass drum from the under side thereof and its intermediate portion inserted through a guide eye 55 on the rear axle structure 16. The outer end of the windlass shaft 39 extends into an aperture formed in the running board guard 13 and is flattened to receive a socket hand crank 56, by which the windlass drum 38 may be rotated in the proper direction to wind the cable thereon.

To lock the windlass drum 38 against rotation under a pulling strain on the cable 50, I provide a hook-like latch lever 57 intermediately pivoted to a bracket 58 on the frame 11, and arranged to enter a lock aperture 59 in the periphery of the internal gear 45. A foot pedal 60 is pivoted to the long end of the latch lever 57 for operating the same and holding it in either of its two extreme positions. This latch lever 57 extends upward through an aperture 61 in the floor 17, and is provided with two vertically spaced lock notches 62 arranged to alternately embrace the floor 17, and thereby hold said foot lever in its two extreme positions. When the upper lock notch 62 embraces the floor 17, the latch lever 57 is in a released position, and when the lower lock notch 62 embraces said floor, the latch lever 57 is interlocked with the lock aperture 59, and thereby holds the windlass drum against rotation. A leaf spring 63, anchored to the floor 17, bears against the foot pedal 61 and yieldingly holds its lock notches 62 in engagement with the floor.

By the use of the windlass attachment, an automobile may easily draw itself out of a sink-hole, sand, mud, ruts, or snow. In this use of the attachment, the cable 50 is pulled out in front of the automobile or behind the same, depending on which way the automobile is to be moved, and the tripod anchored in the ground. With the cable thus anchored, the clutch 32 is shifted into the half-clutch member 44 and the windlass shaft 39 driven from the driving member 21 of the transmission shaft in the same manner that the automobile is driven. Under the rotation of the windlass drum 38, the cable 50 is wound thereon and the automobile pulled toward the anchor. By shifting the clutch 32 entirely out of the half-clutch member 31, all of the power of the engine will be transmitted to the windlass drum 38, or, by having the clutch 32 in engagement with both of the half-clutch members 31 and 44, the rear traction wheels 15 will also be driven with the windlass drum, and thereby assist in moving the automobile.

The attachment may also be used in towing an automobile, in which case a portion of the cable will be unwound from the windlass drum and secured to the towing machine. When a sufficient length of cable has been unwound from the windlass drum, said drum is secured against further rotation by the latch lever 57.

By placing the windlass drum 38 under the running board guard 13, the same is entirely out of sight, and, at the same time, in a convenient position and always ready for use. The tripod may be folded and stored in any convenient place.

What I claim is:—

1. The combination with a motor-propelled vehicle having a running board, and a guard between the running board and frame of the vehicle, of a windlass having a shaft, driving connections including a clutch for connecting the windlass shaft to the transmission shaft of the motor, at will, said windlass being located under said guard, a crank adapted to be attached to the windlass outward of the guard for rotating said windlass when its shaft is disconnected from said transmission, and a cable secured to the windlass and adapted to be anchored at a distant point.

2. The combination with a motor-propelled vehicle having a transmission shaft comprising a driving member and a driven member, of a windlass having a shaft mechanism including a clutch for connecting either the driven member of the transmission shaft or the windlass shaft to the driving member of said transmission shaft or both thereof to the driving member of said transmission shaft, and a cable secured to the windlass and adapted to be anchored at a distant point.

3. The combination with a motor-propelled vehicle having a transmission shaft comprising a driving member and a driven member, of a windlass having a shaft with a worm gear, a worm loosely journaled on the driving member of the transmission shaft and meshing with said worm gear, a clutch for connecting either the driven member of the transmission shaft or the worm to the driving member of said transmission shaft or both thereof, and a cable secured to the windlass and adapted to be anchored at a distant point.

In testimony whereof I affix my signature in presence of two witnesses.

ELMER L. BLY.

Witnesses:
 IMBERT ROE,
 I. F. GOSPODAR.